US012680562B2

(12) United States Patent
Radanovic et al.

(10) Patent No.: US 12,680,562 B2
(45) Date of Patent: Jul. 14, 2026

(54) DEVICE FOR COMPENSATING FOR TOLERANCES BETWEEN TWO COMPONENTS TO BE CONNECTED TO ONE ANOTHER

(71) Applicant: WITTE Automotive GmbH, Velbert (DE)

(72) Inventors: Vladimir Radanovic, Cologne (DE); Glen Lee, Cologne (DE); Philipp Meissner-Linnemann, Essen (DE)

(73) Assignee: Witte Automotive GmbH, Velbert (DE)

( * ) Notice: Subject to any disclaimer, the term of this patent is extended or adjusted under 35 U.S.C. 154(b) by 277 days.

(21) Appl. No.: 17/804,335

(22) Filed: May 27, 2022

(65) Prior Publication Data

US 2022/0381274 A1      Dec. 1, 2022

(30) Foreign Application Priority Data

May 27, 2021    (DE) ..................... 10 2021 205 411.0

(51) Int. Cl.
*F16B 5/02*          (2006.01)

(52) U.S. Cl.
CPC .................................. *F16B 5/0233* (2013.01)

(58) Field of Classification Search
CPC ........ F16B 5/0233; F16B 5/025; F16B 37/04; F16B 5/0283

(Continued)

(56) References Cited

U.S. PATENT DOCUMENTS 6,884,014 B2 * 4/2005 Stone ...................... F16B 5/025
                                                        411/352
2002/0150445 A1 * 10/2002 Ozawa .................... F16B 33/02
                                                        411/546

(Continued)

FOREIGN PATENT DOCUMENTS

CN          104889946 A      9/2015
CN          109114080 A      1/2019
(Continued)

OTHER PUBLICATIONS

German Patent and Trade Mark Office, Search Report in Application No. DE 102021205411.0, dated Feb. 5, 2022; 8 pages, Munchen, Germany. May 2, 2022.

(Continued)

*Primary Examiner* — Kristina R Fulton
*Assistant Examiner* — Jock Wong
(74) *Attorney, Agent, or Firm* — Marshall & Melhorn, LLC

(57)          ABSTRACT

A device for compensating for tolerances between two components to be connected to one another may have a hollow-cylindrical base element. The device may also have a hollow-cylindrical compensating element which comes into a first threaded engagement with the base element. The device may also have a connecting element extending through a first cavity of the device for connecting the two components. The connecting element comes into a second threaded engagement with one of the components and/or a first nut element. A second nut element is arranged in a recess of the compensating element in such a way that it comes into a third thread engagement with the connecting element. When the connecting element is screwed into one of the components and/or into the first nut element, the second nut element, at least in portions, is axially movable (Continued)

independently of the compensating element and relative thereto.

16 Claims, 17 Drawing Sheets

(58) Field of Classification Search
USPC .......................................... 411/190, 546, 999
See application file for complete search history.

(56) References Cited

U.S. PATENT DOCUMENTS

| | | | |
|---|---|---|---|
| 2004/0022600 A1* | 2/2004 | Kovac ................... | F16B 41/002 |
| | | | 411/353 |
| 2007/0297869 A1* | 12/2007 | Kunda .................... | F16B 5/025 |
| | | | 411/108 |
| 2011/0243655 A1* | 10/2011 | Binder ................. | F16B 5/0283 |
| | | | 403/343 |
| 2014/0096362 A1* | 4/2014 | Staley .................. | F16B 5/0283 |
| | | | 29/525.02 |
| 2014/0352810 A1* | 12/2014 | Wedi ..................... | E03F 5/0408 |
| | | | 137/362 |
| 2017/0152876 A1* | 6/2017 | Erpenbeck ........... | F16B 37/043 |
| 2018/0298936 A1* | 10/2018 | Bräutigam ........... | B60Q 1/0686 |

FOREIGN PATENT DOCUMENTS

| | | | | |
|---|---|---|---|---|
| CN | 111255794 A | | 6/2020 | |
| DE | 60119882 T2 | | 5/2007 | |
| DE | 202007008643 U1 | | 9/2007 | |
| DE | 102008037071 A1 | * | 2/2010 | ............. F16B 5/025 |
| DE | 102011056465 A1 | * | 6/2013 | ............. F16B 31/02 |
| DE | 102013216716 A1 | * | 2/2015 | ........... F16B 33/002 |
| DE | 102014006088 A1 | * | 10/2015 | ........... F16B 37/048 |
| DE | 202018104330 U1 | * | 8/2018 | ............. B62D 27/02 |
| DE | 102018108830 A1 | * | 10/2018 | .......... B62D 27/065 |
| DE | 102018201496 A1 | * | 8/2019 | ........... F16B 5/0233 |
| EP | 0679553 A1 | * | 11/1995 | |
| EP | 3244073 A1 | * | 11/2017 | ........... F16B 41/002 |
| EP | 3473779 B1 | * | 3/2021 | ........ E04B 1/17637 |

OTHER PUBLICATIONS

China National Intellectual Property Administration, Office Action in Application No. CN202210600193.9 dated Mar. 26, 2025, 10 pages.

* cited by examiner

DEVICE FOR COMPENSATING FOR TOLERANCES BETWEEN TWO COMPONENTS TO BE CONNECTED TO ONE ANOTHER

FIELD

The invention relates to a device for compensating for tolerances between two components to be connected to one another.

BACKGROUND

Known devices for compensating for tolerances between two components (also called compensating device for short) are formed by a base element or body and an axial compensating element, for example metallic threaded sleeves, which are in a threaded engagement, for example left-hand thread engagement. A spring element is usually arranged in the axial compensating element, which spring element creates a frictional connection between a connecting element that is passed through the compensating device and has a further thread (right-hand thread) and the axial compensating element, so that when the connecting element is tightened, for example rotated, a torque is applied to the axial compensating element, which causes an axial unscrewing of the compensating element from the base element counter to the insertion direction of the connecting screw and thus compensates for axial tolerances.

SUMMARY

The object of the invention is to specify a particularly simple device for compensating for tolerances between two components to be connected to one another.

The object is achieved according to the invention by a device for compensating for tolerances between two components to be connected to one another having the features of the claims.

The dependent claims relate to advantageous developments.

The device according to the invention for compensating for tolerances between two components to be connected to one another comprises at least a hollow-cylindrical base element, a hollow-cylindrical compensating element which comes into a first threaded engagement with the base element and which can be moved from an initial position into a compensating position by means of rotation relative to the base element, and a connecting element extending through a first cavity of the device for connecting the two components, wherein the connecting element comes into a second threaded engagement with one of the components and/or a first nut element, and wherein a second nut element is arranged in a recess of the compensating element in such a way that this second nut element comes into a third thread engagement with the connecting element when the connecting element is screwed into the device, wherein when the connecting element is further screwed into one of the components and/or into the first nut element, the second nut element, at least in portions, is movable, in particular adjustable, independently of the compensating element and relative thereto in an axial manner, in particular counter to a screwing-in direction of the connecting element.

The advantages achieved with the invention consist in particular in the fact that the compensating element and the base element are, at least in portions, outside of a force flow with the connecting element, by a third thread engagement between the second nut element and the connecting element taking place correspondingly in portions during assembly and screwing of the connecting element into the device, and a frictional connection being provided, so that only the second nut element is axially movable or moved without the compensating element. In this way, it is possible to synchronize at least one of the other thread engagements, in particular the second thread engagement, for example the thread starts of the connecting element and the first nut element, in a simple manner. In the assembled state, the torque of the fastening process leads to a force flow and a clamping connection (also referred to as clamping) between the connecting element and the second nut element, in particular between the connecting head and the second nut element. The force of the connecting element, in particular a connecting screw, clamps the second nut element and one of the components together and fixes them. A clamping load or tension between the other components, in particular between the compensating element and the base element, is thus avoided. As a result, the compensating element and the base element can be made from plastics material, for example. The axial tolerance compensation is effected by the threads of the two nut elements and the connecting element.

In one possible embodiment, the second nut element is arranged in the recess at least one synchronizing height lower than a flange surface or end surface of the compensating element. For example, the synchronizing height corresponds to at least one thread pitch of the first thread engagement between the compensating element and the base element.

In a further embodiment, the second nut element is arranged in a form-fitting manner in the compensating element in an initial position. In other words: At least in the initial position, the second nut element is arranged in the compensating element in a rotationally fixed manner. For example, the compensating element comprises a receiving portion in which the second nut element is arranged in a form-fitting manner in the initial position.

In addition, the receiving portion has a number of longitudinal ridges. In order to receive the second nut element, the receiving portion preferably has a hexagonal contour, in which the nut head in particular is received.

According to a further embodiment, the longitudinal ridges extend along a longitudinal axis in the receiving portion and have a decreasing height toward the flange surface. In particular, the longitudinal ridges have a shape and/or dimensions such that the second nut element is arranged in the receiving portion at least in a form-fitting manner in the direction of rotation. In addition, the longitudinal ridges can have such a shape and/or dimensions that the second nut element is arranged in the receiving portion at least in a frictional manner in the axial direction along the longitudinal axis of the device.

When the connecting element is inserted into the second nut element, they come into threaded engagement with one another. When the connecting element is inserted further through the second nut element into the compensating element, the connecting element and the compensating element come into a driving engagement for the axial compensating movement. The compensating element moves counter to the insertion direction of the connecting element and relative to the base element. The second nut element is arranged in the receiving portion of the compensating element in such a way that it is carried along when the compensating element moves.

When the connecting element is screwed further into the device, in particular in the direction of the first nut element, for example a weld nut, it is possible that the thread turn of the connecting element cannot immediately engage in the thread turn of the first nut element, for example due to component tolerances.

Therefore, a torque is exerted on the second nut element as a result of the third thread engagement between the connecting element and the second nut element, which torque overcomes the form-fitting contact on the longitudinal ridges, so that the second nut element is rotated axially in or out of the receiving portion counter to the insertion direction of the connecting element. In particular, the second nut element is rotated axially in the direction of the flange surface and independently of the compensating element and base element in the receiving portion or at least partially out of said portion. In particular, the second nut element is moved axially in the receiving portion until the thread turn of the connecting element engages or threads into the thread turn of the first nut element. This movement can, for example, be carried out up to a rotation of 360° and can thus amount in particular to a thread pitch.

For this purpose, the second nut element has a corresponding internal thread. The connecting element is designed as a connecting screw or a threaded bolt with a corresponding external thread.

The base element and the compensating element can each be made from a plastics material. Alternatively, other materials such as metals can also be provided. The base element and the compensating element can be made from the same material or from different materials.

In addition, the compensating element and the base element surround the connecting element coaxially. The compensating element and the base element have a longitudinal extension, which is an extension along a longitudinal axis. The compensating element and the base element are in particular designed to be rotationally symmetrical about their longitudinal axes. In the assembled state of the device, the longitudinal axes of the compensating element, the base element and the connecting element coincide. In addition, the compensating element is axially movably arranged in the base element for tolerance compensation.

DESCRIPTION OF THE FIGURES

Embodiments of the invention are explained in greater detail with reference to the drawings, in which.

DETAILED DESCRIPTION

Parts corresponding to one another are provided with the same reference signs in all the drawings.

Figure 1A:
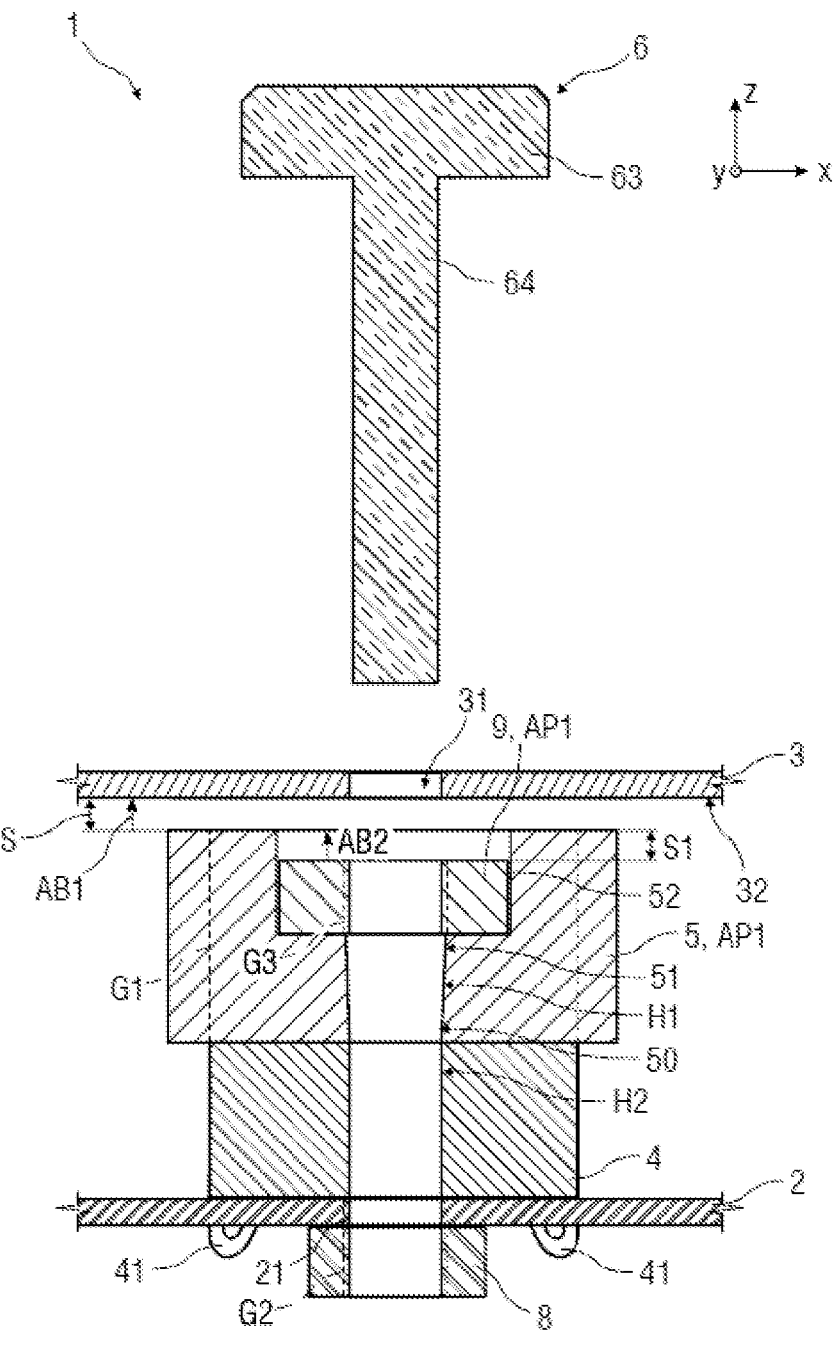
FIG. 1A is a schematic representation of an embodiment of a device for compensating for tolerances between two components in an initial position with a height gap to be compensated for between the components and in a compensation position with a compensated height gap and compensated synchronizing height.

FIG. 1A is a schematic representation of an embodiment of a device 1 for compensating for in particular axial tolerances, in particular a height gap S, between two components to be connected to one another. The device 1 is provided, for example, for attaching a first component 2, for example a bearing bracket, an electronic part, a lamp or a decorative part, to a second component 3, for example a door panel, a supporting structure or a body structure of a vehicle.

The device 1 comprises at least a hollow-cylindrical base element 4 and a hollow-cylindrical compensating element 5. The hollow-cylindrical base element 4 is designed as a retaining element for the first component 2. For this purpose, the first component 2 has at least one or more recesses (not shown in detail). The base element 4 comprises at least one or more flexible retaining lugs 41 which pass through the recesses and strike retainingly against an underside of the first component 2.

FIG. 1A shows the device 1 in a partially assembled state in an initial position AP1 in which the compensating element 5 is arranged at a distance, corresponding to a height gap S, from the second component 3.

Figure 1B:
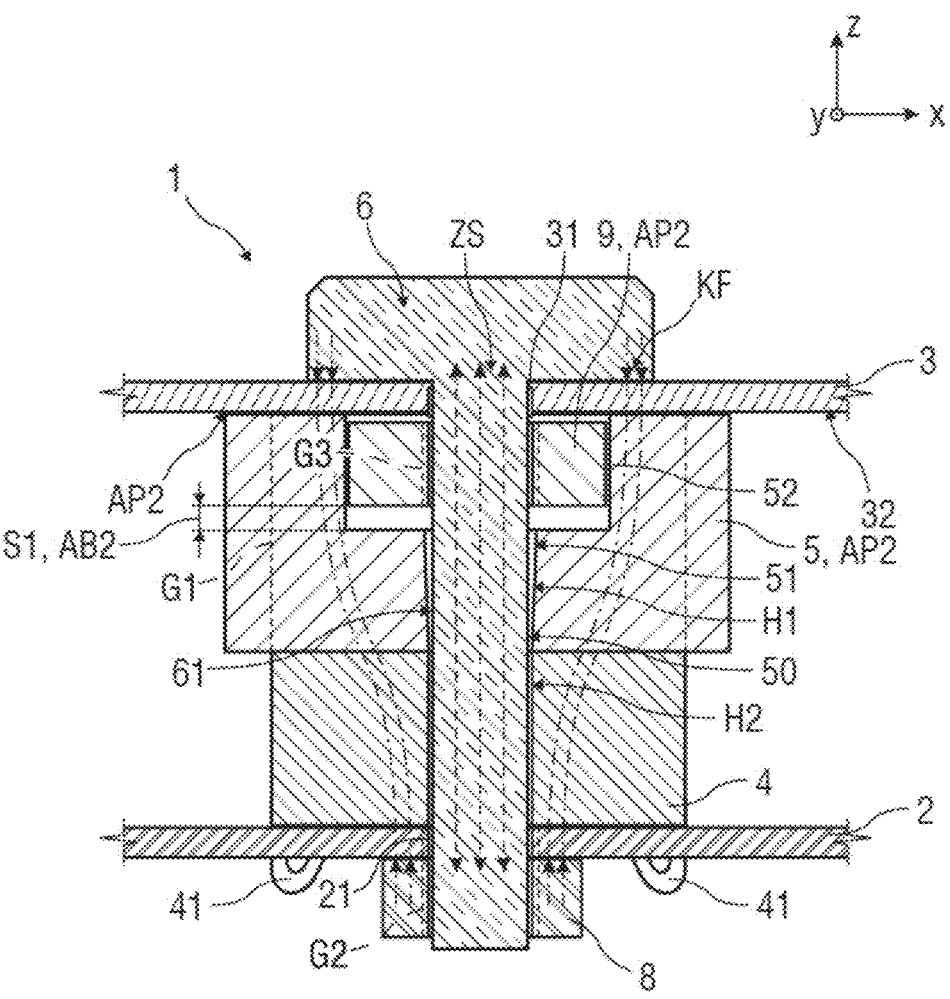
FIG. 1B is a schematic representation of an embodiment of a device for compensating for tolerances between two components in an initial position with a height gap to be compensated for between the components and in a compensation position with a compensated height gap and compensated synchronizing height.

At least when the device 1 is assembled, the compensating element 5 comes into a first threaded engagement G1 with the base element 4; the compensating element 5 can be moved from the initial position AP1 into a compensating position AP2 by means of rotation relative to the base element 4 in order to compensate for the height gap S in a first compensating movement AB1 as illustrated by the sequence of FIGS. 1A and 1B.

FIG. 1B shows the device 1 in the compensating position AP2, in which the height gap S is compensated for and the two components 2 and 3 are connected to one another by means of a connecting element 6, in particular by means of a clamping connection.

The connecting element 6 is a connecting screw, for example, which extends at least through a first cavity H1 and a second cavity H2 of the device 1 in order to connect the first component 2 and the second component 3 to one another.

When the device 1 is assembled, the connecting element 6 comes into a second threaded engagement G2 with one of the components 2, 3 and/or a first nut element 8, in particular for connecting, in particular clamping, the two components 2 and 3 to one another.

A second nut element 9 is provided for synchronizing the first thread engagement G1 and the second thread engagement G2 when the device 1 is assembled. The second nut element 9 is arranged in the compensating element 5 in such a way that it is axially moved in the compensating element 5 at least in portions independently of the compensating element 5 and relative thereto, in particular in accordance with a second compensating movement AB2, as described in more detail below.

The assembly takes place as follows:

The base element 4 and the compensating element 5 are arranged in the screwed state together on the first component 2, in particular clipped, for example connected to the first component 2 by means of retaining lugs 41. The second nut element 9 is arranged in a rotationally fixed manner in a receptacle 52, in particular in a receiving portion 522, of the compensating element 5.

The second component 3 is arranged with a through-opening 31 concentrically to the opening of the receptacle 52.

The connecting element 6, in particular a screw with a screw head 63 and a threaded shank 64, is inserted, in particular screwed, through the through-opening 31 in the second component 3 into the second nut element 9. The second nut element 9 is arranged in the compensating element 5 in a rotationally fixed manner.

The connecting element 6 is then inserted further into the compensating element 5 and comes into contact with a non-circular inner contour 51 of the compensating element 5. Alternatively, instead of the non-circular inner contour 51, a conventional driver element (not shown in detail), in particular a spring element, can be arranged in the compensating element 5.

This results in a first compensating movement AB1, by the compensating element 5 being brought into contact with the second component 3 by the driving of the non-circular inner contour 51 or the spring element by the connecting element 6, as shown in FIG. 1B. In other words: The connecting element 6 and the compensating element 5 come into a driving engagement for the first, in particular axial, compensating movement AB1. The compensating element 5 moves counter to the insertion direction of the connecting element 6 and relative to the base element 4. This first compensating movement AB1 in the axial direction serves to compensate for axial tolerances between the two components 2 and 3. The maximum length of the first compensating movement AB1 corresponds approximately to the height gap S.

Figure 1C:
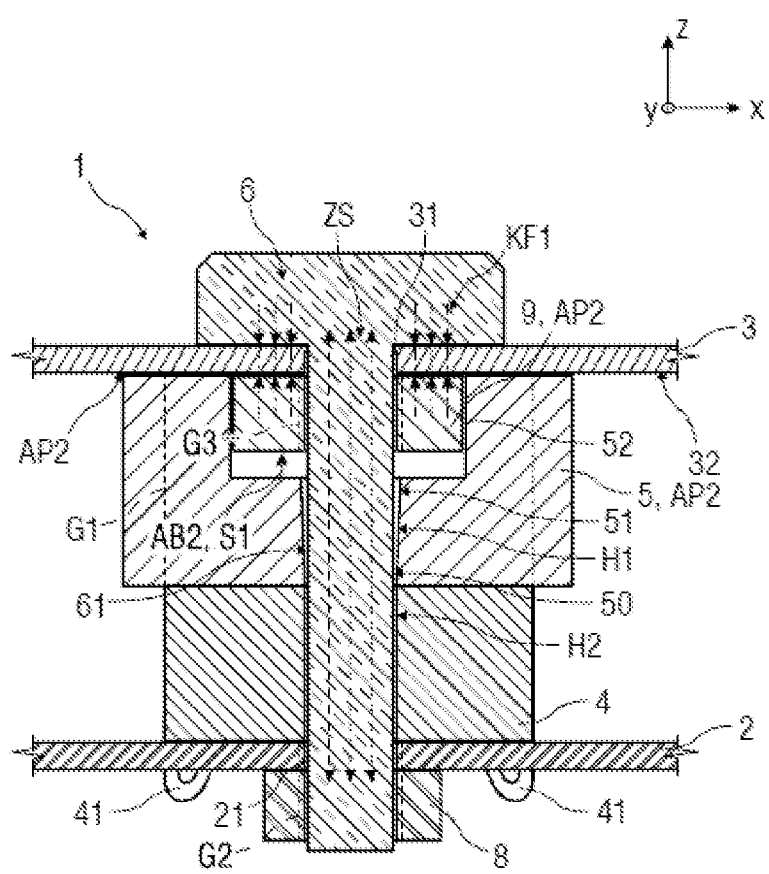
FIG. 1C is a schematic representation of an embodiment of a device for compensating for tolerances between two components in an initial position with a height gap to be compensated for between the components and in a compensation position with a compensated height gap and compensated synchronizing height.

The connecting element 6 comes into frictional engagement with the inner contour 51 of the compensating element 5. As a result of the frictional engagement, the connecting element 6 transmits a torque to the compensating element 5, so that the compensating element 5 axially moves in the opposite direction to the insertion direction of the connecting element 6 and relative to the second nut element 9 and to the base element 4 in the direction of the second structural element 3 according to the first compensating movement AB1 until the compensating element 5 strikes the underside 32 of the second component 3, as shown in FIG. 1B or 1C. This position corresponds to the compensating position AP2. This movement of the compensating element 5 when the connecting element 6 is screwed into the device 1 is the first compensating movement AB1, in which the compensating element 5 is moved axially in the direction of the second component 3 relative to the base element 4 and to the components 2 and 3. As a result, axial tolerances between the components 2 and 3 are compensated for.

The second nut element 9 is arranged in the compensating element 5 in such a way that it can be carried along during this first compensating movement AB1 of the compensating element 5. In other words: During this first compensating movement AB1 of the compensating element 5, the second nut element 9 has moved relative to the base element 4 and the components 2 and 3, but not axially relative to the compensating element 5. Alternatively, the second nut element 9 can be arranged in a recess 52 in the compensating element 5 so that it can move axially upward and downward, so that the compensating element 5 does not necessarily carry the second nut element 9 along with it.

When the connecting element 6 is inserted further into the device 1, it is possible that the thread turn of the connecting element 6 cannot immediately engage in the thread turn of the first nut element 8 or strikes said thread turn.

In order to synchronize the two thread turns, therefore, as a result of the threaded engagement between the second nut element 9 and the connecting element 6, the second nut element 9 is moved axially relative to the compensating element 5 and independently thereof according to the second compensating movement AB2. The second nut element 9 is moved axially, independently of the compensating element 5, counter to the insertion direction of the connecting element 6 until the thread turn of the connecting element 6 engages in the thread turn of the first nut element 8. The maximum length of the second compensating movement AB2 corresponds approximately to a synchronizing height S1.

In order to synchronize the thread starts of the second thread engagement G2, a torque is exerted on the second nut element 9 as a result of the third thread engagement G3 between the connecting element 6 and the second nut element 9, which torque overcomes the form-fitting contact on the longitudinal ridges 524, so that the second nut element 9 is rotated axially in or out of the receiving portion 522 counter to the insertion direction of the connecting element 6. In particular, the second nut element 9 is rotated axially in the direction of the flange surface and independently of the compensating element 5 and base element 4 in the receiving portion 522 or at least partially out of said portion. In particular, the second nut element 9 is moved axially in the receiving portion 522 until the thread turn of the connecting element 6 engages or threads into the thread turn of the first nut element 8. This movement serves to synchronize the thread turns of the second thread engagement G2 and represents the second compensating movement AB2.

Depending on the arrangement of the thread turns in relation to one another, the synchronizing length can, under certain circumstances, be up to a rotation of 360° until the thread turns interlock. This synchronizing length according to the second compensating movement AB2 has a corresponding adjustable synchronizing height S1 of the second nut element 9. One revolution can be approximately one thread pitch, for example. This one thread pitch can in turn correspond approximately to the synchronizing height S1 and/or the height gap S.

However, it can also be the case that the second compensating movement AB2 does not completely compensate for the height gap S because, for example, only half a thread pitch is necessary so that the connecting element 6 can thread into the first nut element 8, in particular the thread turns of which interlock. In this case, the synchronizing height S1 is smaller than the height gap S, as shown in FIG. 1B.

In this case, if only the compensating element 5 is tensioned against the second component 3 by means of a connecting element 6, a corresponding force flow KF of a compressive stress extends between the connecting element 6 and the first nut element 8 via the compensating element 5 and the base element 4.

In addition, the torque of the fastening process of the two components 2 and 3 can under certain circumstances result in a force flow KF1 of a compressive stress that is different than in conventional clamping connections, in particular in a clamping connection (also referred to as clamping) between the connecting element 6 and the second nut element 9, in particular between the screw head 63 and the second nut element 9. When the device 1 is in the assembled state, the connecting element 6 is subjected to a tensile stress ZS.

This changed force flow KF1 is shown in FIG. 1C.

During the second compensating movement AB2, the second nut element 9 comes into contact with the second component 3, so that the tensile force of the connecting element 6 tensions the second nut element 9 with the second component 3 and fixes them together.

Alternatively or additionally, a kind of setting behavior between the base element 4 and the compensating element 5 can already occur during assembly and thus during the screwing-in process or later in the assembled state, if these are plastics parts, for example, so that the changed force flow KF1 always occurs at the device 1.

In the case of the changed force flow KF1 between the connecting element 6 and the second nut element 9 in the assembled state of the device 1, a clamping load or tension between the other components, in particular between the compensating element 5 and the base element 4, is avoided.

The second nut element 9 is arranged in the recess 52 of the compensating element 5 in such a way that when the connecting element 6 is screwed into the device 1, this second nut element 9 comes into a third threaded engagement G3 with the connecting element 6, and therefore when the connecting element 6 is screwed into the first component 2 and/or the first nut element 8, the second nut element 9, at least in portions, is axially moved independently of the compensating element 5 and relative thereto, as has been described in detail above.

In the assembled state of the device 1, the compensating element 5 and the base element 4 are therefore outside of the changed force flow KF1 of the second nut element 9 with the connecting element 6. Due to the frictional connection of the connecting element 6 to the second nut element 9 via the third thread engagement G3, the second nut element 9 is moved axially in the device 1 without the compensating element 5, which allows simple synchronization of the subsequent first and second thread engagements G1 and G2.

In addition, the first cavity H1 has an inner contour 51 in cross section. The connecting element 6 has an outer contour 61 in cross section.

The first cavity H1 is formed by the hollow interior of the compensating element 5. The inner contour 51 is formed on the inner wall of the compensating element 5.

In addition, the connecting element 6 extends through a second cavity H2 formed by the hollow interior of the base element 4.

Figure 4:
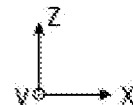
FIG. 4 is a sectional view of an embodiment for the device without a connecting element.
Figure 4:
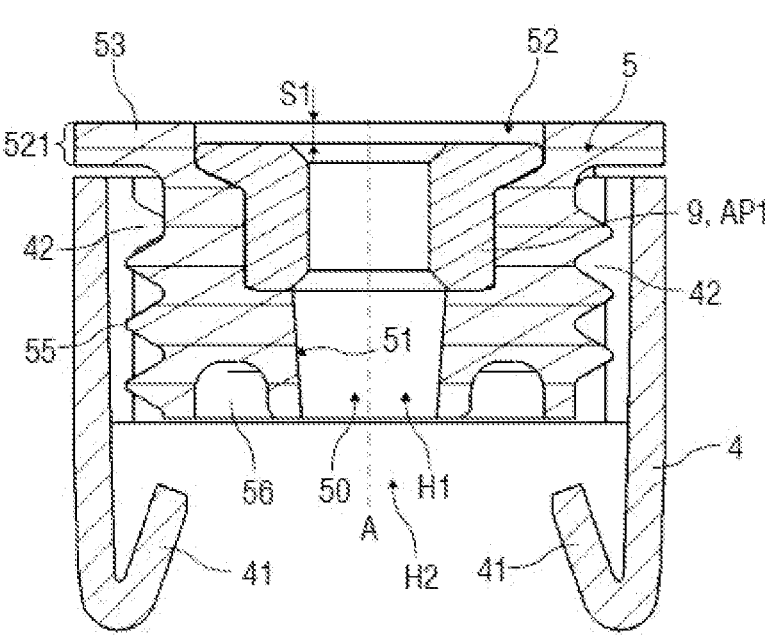

In the embodiment, the base element 4 is arranged coaxially in the compensating element 5. Alternatively, the compensating element 5 can be arranged coaxially in the base element 4, as shown in FIG. 4.

The inner contour 51 differs from the outer contour 61 in particular in that when the inner contour 51 and the outer contour 61 are aligned concentrically to one another, at least one radial overhang 7 and/or an integrated driver 50 is/are formed, as shown in FIG. 2A to 2E.

Such a design of the contours with at least one radial overhang 7 and/or with at least one integrated driver 50 allows a targeted frictional connection between the connecting element 6 and the compensating element 5 at least in portions. As a result, at least a portion of the connecting element 6 can be used to maintain a distance between the components 2, 3 to be connected. This allows a spring-free design of the device in contrast to conventional compensating devices. The radial overhang 7 and/or the integrated driver 50 on the compensating element 5 is formed in the device 1 by a corresponding design of the inner contour 51, in particular a non-circular inner contour 51. In particular, the interaction of the inner contour 51 and the outer contour 61 results in a frictional connection, as a result of which the torque of the connecting element 6 is transmitted and exerted on the compensating element 5. In addition, the number of components of the device according to the invention is reduced.

Figure 2A:
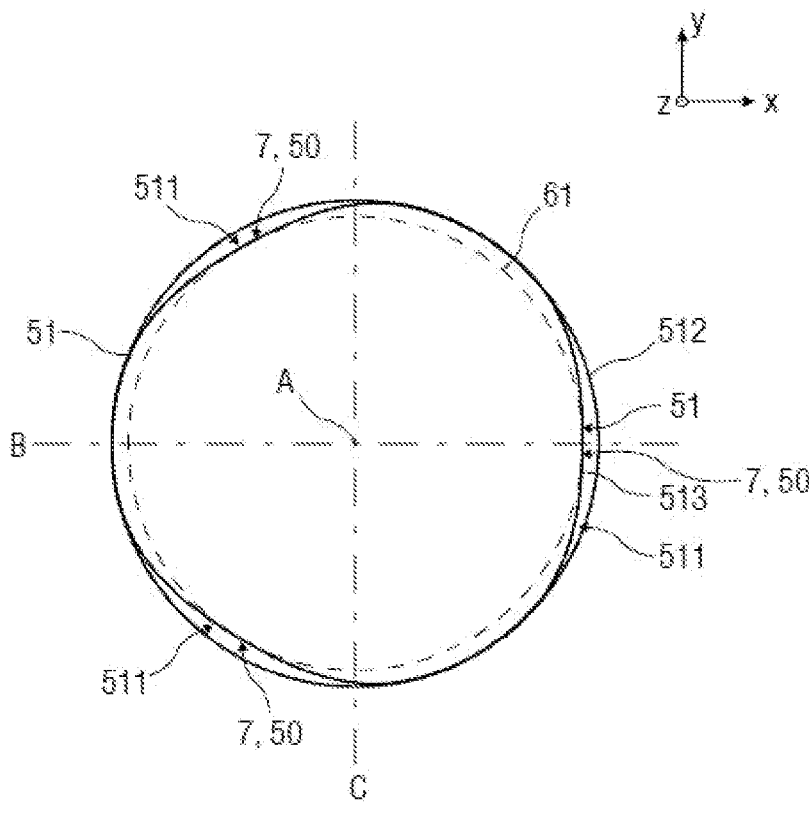
FIG. 2A is a schematic representation of a first embodiment for an inner contour of a compensating element and an outer contour of a connecting element.
Figure 2B:
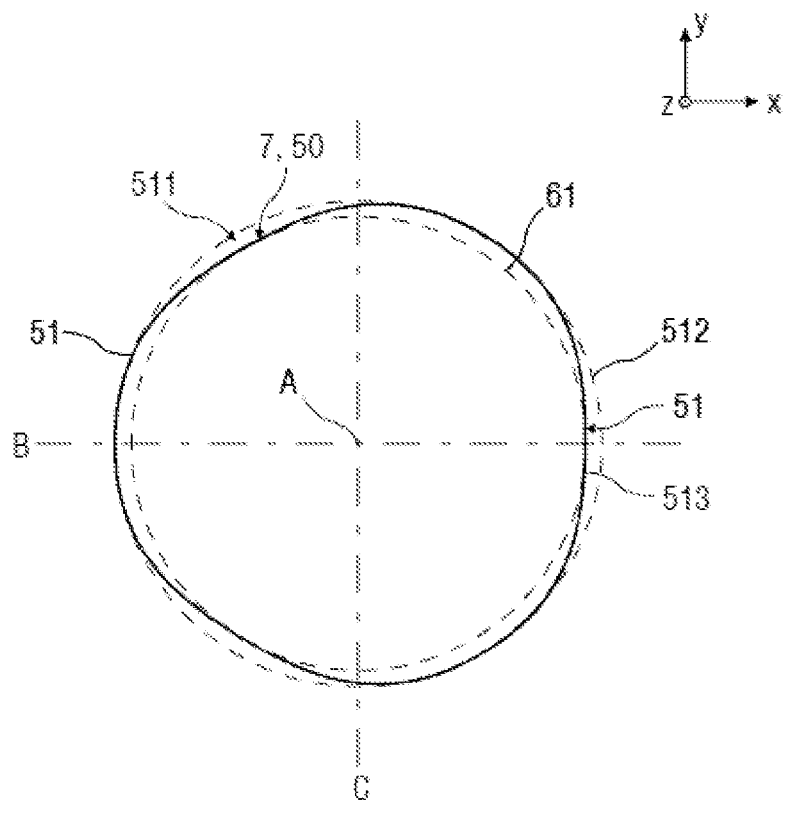
FIG. 2B is a schematic representation of a first embodiment for an inner contour of a compensating element and an outer contour of a connecting element.

FIGS. 2A and 2B are each a simplified schematic representation in cross section of the inner contour 51 of the compensating element 5 and the outer contour 61 of the connecting element 6. The inner contour 51 shown in FIG. 2A or 2B and the outer contour 61 lie in a plane that is spanned by two axes B and C, with the axis B and the axis C being perpendicular to one another and perpendicular to the longitudinal axis A of the device 1. The longitudinal axis A runs through the intersection of the two axes B and C.

Figure 2C:
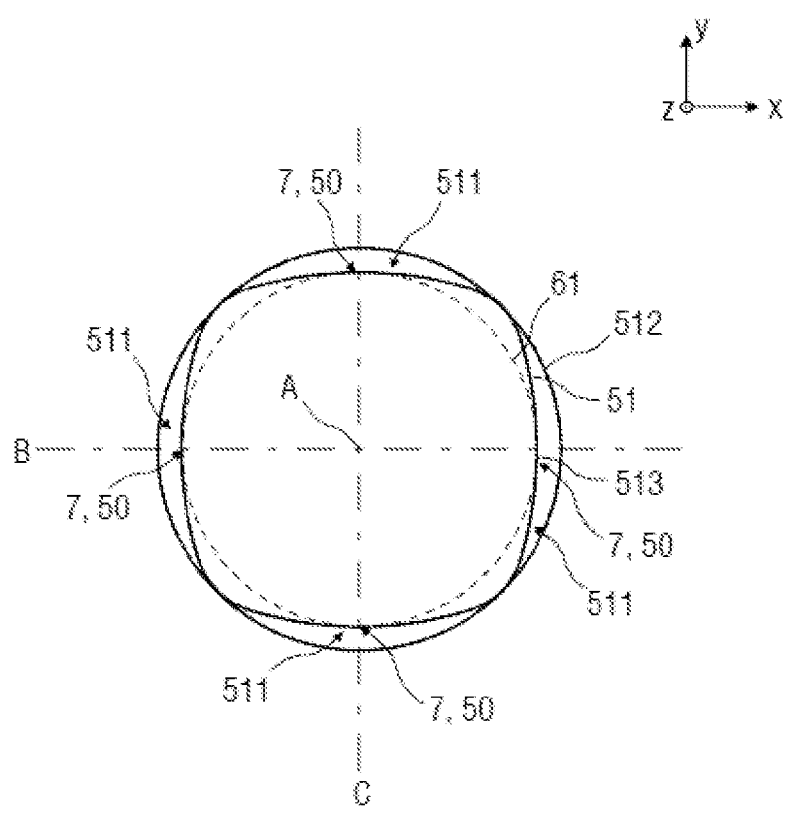
FIG. 2C is a schematic representation of a second embodiment for an inner contour of a compensating element and an outer contour of a connecting element.

The inner contour 51 in each case is substantially non-circular. The outer contour 61 in each case is substantially circular. In the embodiment, the inner contour 51 according to FIG. 2A is trilobular and has three rounded corners, also referred to as a round triangle. Alternatively, the inner contour 51 can be oval or elliptical, in which case only two radial overhangs 7 are formed instead of three radial overhangs 7 and/or integrated drivers 50. The inner contour 51 can also be designed in such a way that four radial overhangs 7 and/or integrated drivers 50 are formed, as shown in FIG. 2C. Such an inner contour 51 is also referred to as a round quadrilateral.

Figure 2D:
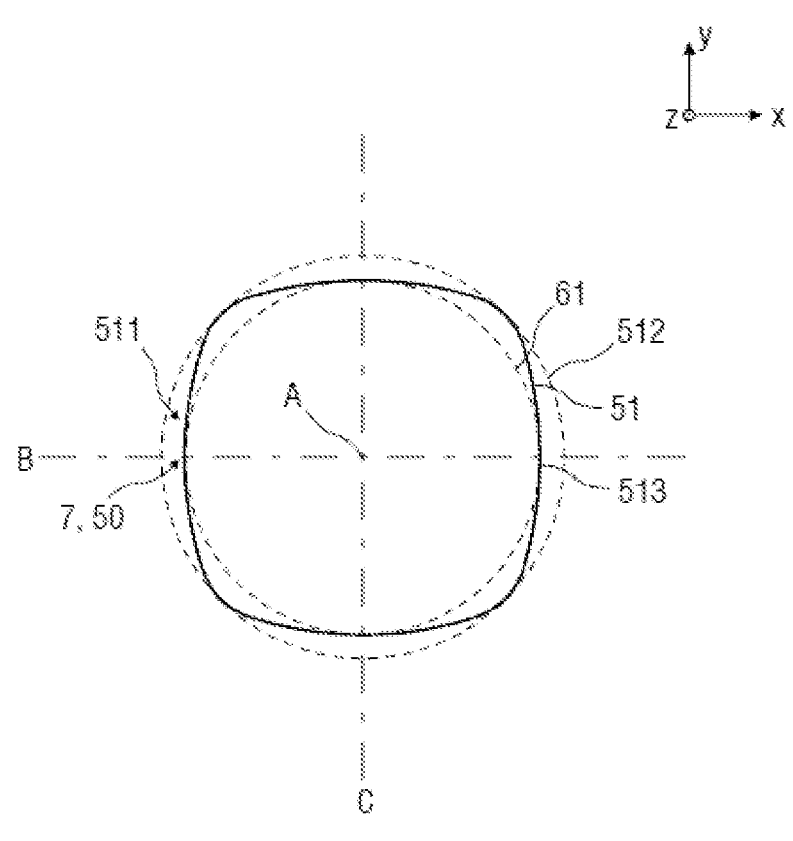
FIG. 2D is a schematic representation of a second embodiment for an inner contour of a compensating element and an outer contour of a connecting element.
Figure 2E:
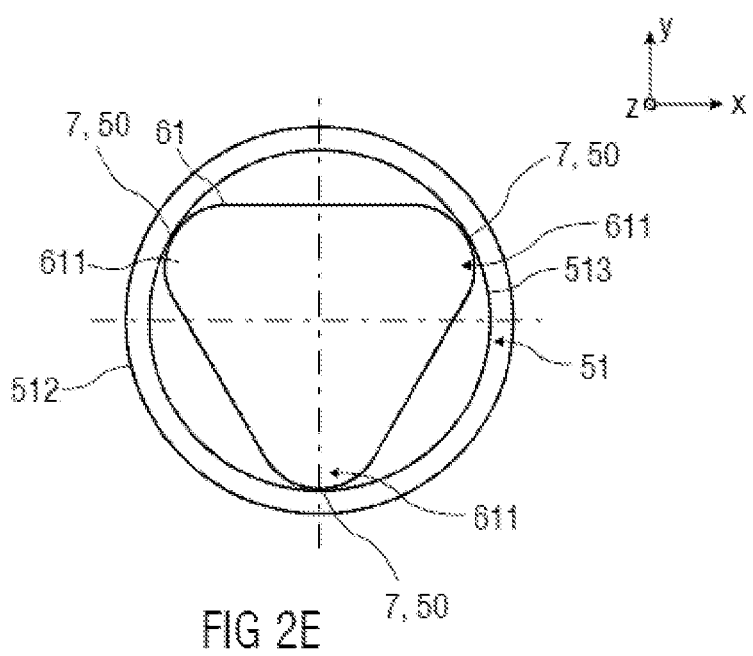
FIG. 2E is a schematic representation of a third embodiment for an inner contour of a compensating element and an outer contour of a connecting element.
Figure 2F:
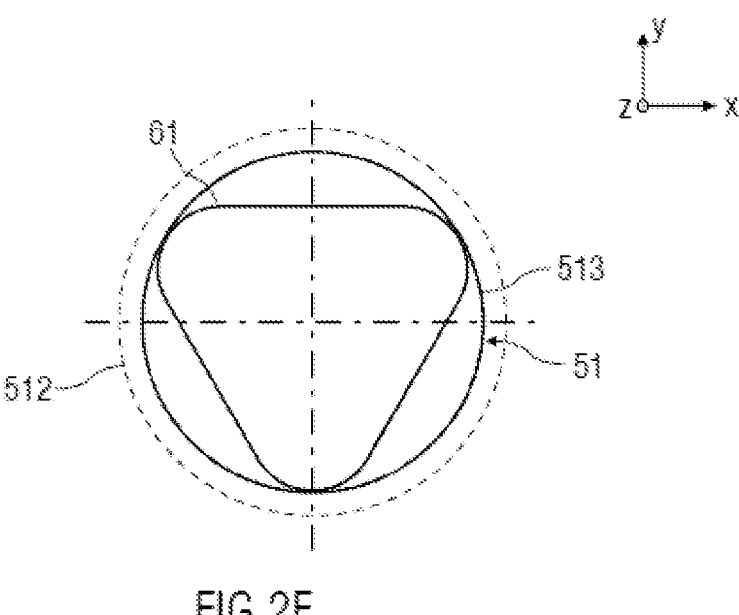
FIG. 2F is a schematic representation of a third embodiment for an inner contour of a compensating element and an outer contour of a connecting element.

Alternatively, the outer contour 61 can be non-circular and the inner contour 51 can be substantially circular, as shown in FIGS. 2E and 2F.

The inner contour 51 (as shown in FIG. 2A to 2D) has, in cross section, at least one bulge 511 which extends radially outwards and in particular protrudes from the inner periphery. The inner contour 51 preferably has a plurality of bulges 511 distributed uniformly around the inner periphery of the compensating element 5.

In an alternative embodiment of the device 1, instead of the bulge 511 on the inner contour 51 of the compensating element 5, at least one or more bulges 611 can be provided on the outer contour 61 of the connecting element 6, as shown in FIG. 2E, 2F.

When the inner contour 51 of the compensating element 5 and the outer contour 61 of the connecting element 6 are aligned concentrically, a radial overhang 7 and/or an integrated driver 50, in particular an integrated driver portion, is formed in the cross section due to the at least one bulge 511 of the inner contour 51 (FIG. 2A to 2D) or the at least one bulge 611 of the connecting element 6 (FIGS. 2E and 2F).

FIG. 2A shows a first embodiment of the inner contour 51 and the outer contour 61 in a plan view from below. The outer contour 61 of the connecting element 6 is circular, in particular round. The inner contour 51 of the compensating element 5 according to FIG. 2A has three bulges 511 which are in particular evenly distributed on the inner periphery of the compensating element 5. FIG. 2B shows the inner contour 51 and the outer contour 61 according to FIG. 2A in a plan view from above.

FIG. 2C shows a second embodiment for the inner contour 51 and the outer contour 61 in a plan view from below. The outer contour 61 is circular, in particular round. The inner contour 51 according to FIG. 2C has four bulges 511 which are in particular evenly distributed on the inner periphery of the compensating element 5. FIG. 2D shows the inner contour 51 and the outer contour 61 according to FIG. 2C in a plan view from above.

FIG. 2E shows a third embodiment for the inner contour 51 and the outer contour 61 in a plan view from below. The inner contour 51 is circular, in particular round. The outer contour 61 according to FIG. 2E has three bulges 611 which are in particular evenly distributed on the outer periphery of the connecting element 6. FIG. 2F shows the inner contour 51 and the outer contour 61 according to FIG. 2E in a plan view from above.

Figure 7A:
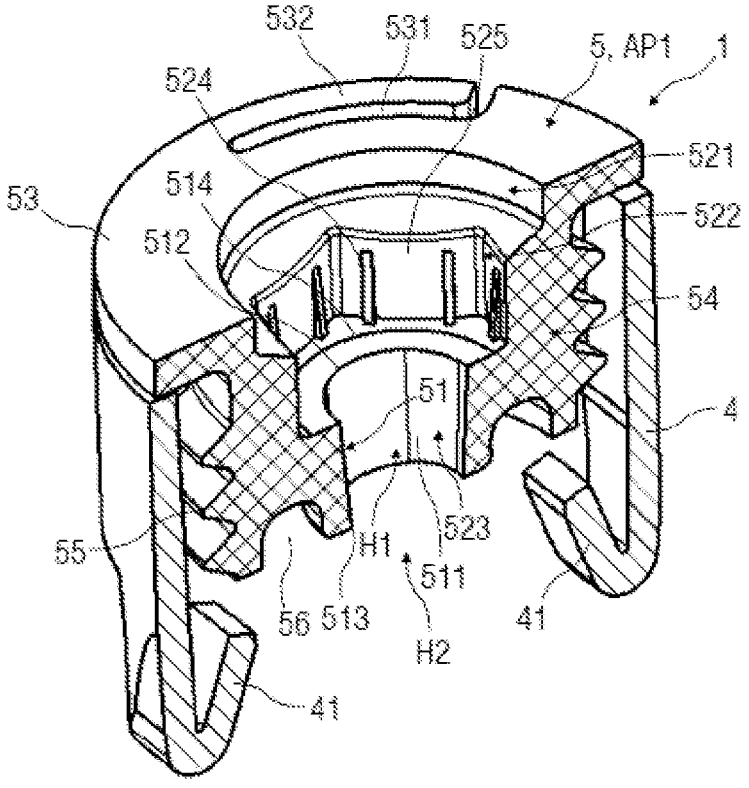
FIG. 7A is a partially sectional view of the device in the assembled state without a connecting element and without a second nut element, with the compensating element being set in an initial position.
Figure 8A:
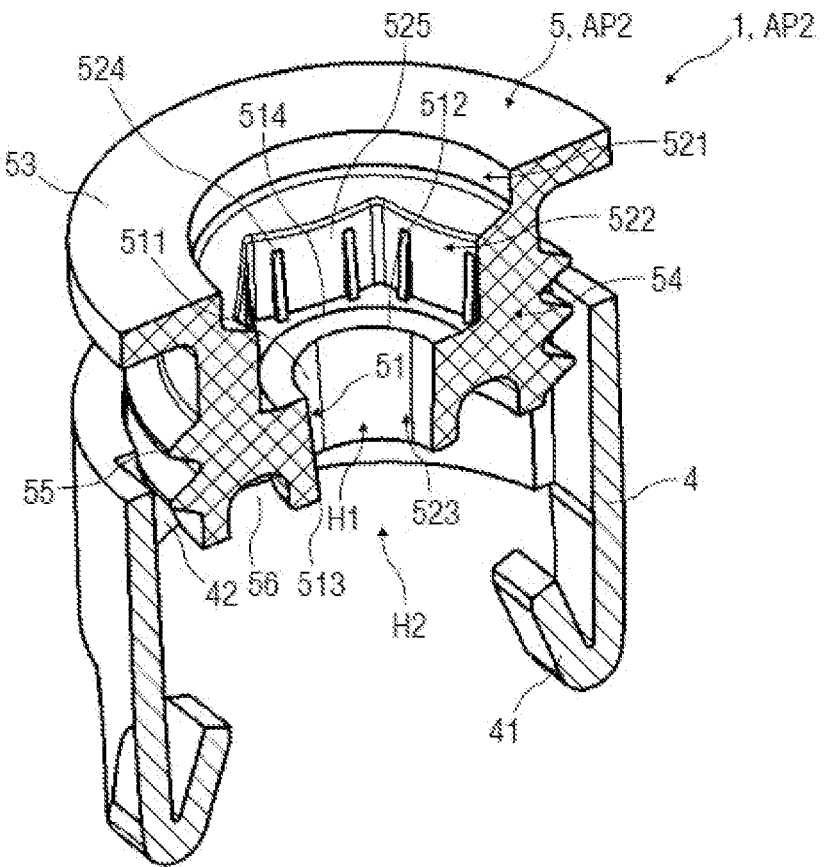
FIG. 8A is a partially sectional view of the device in the assembled state without a connecting element and without a second nut element, with the compensating element being set in a compensating position.

The inner contour 51 of the compensating element 5 is cylindrical for all embodiments. In particular, the relevant inner contour 51 of the various embodiments is cone-shaped or frustoconical with a first radius 512 and a second radius 513 in longitudinal section. The first radius 512 is larger than the second radius 513, as shown in FIGS. 7A and 8A.

The first radius 512 is circular, for example. The second radius 513 is, for example, round-triangular or trilobular, as shown in FIGS. 2A and 2B, or round-quadrilateral, as shown in FIGS. 2C and 2D. The bulges 511 on the inner periphery of the compensating element 5 or the bulges 611 of the connecting element 6 extend in the longitudinal extension of the compensating element 5 and the connecting element 6, in particular over a compensating portion 523 shown in FIG. 3B.

Each bulge 511 or 611 can be designed in the form of a part-circle or a segment of a circle or as a spherical bulge. If several bulges 511 or 611 are provided, they all have the same shape.

The compensating element 5 is designed in one piece. The compensating element 5 is designed without springs. The compensating element 5 has no spring elements.

A first nut element 8 is provided on the underside of the first component 2 for connecting the two components 2 and 3. The first nut element 8 can be a separate element. Alternatively, the first nut element 8 can be welded to the first component 2. The first component 2 and the second component 3 each comprise associated through-openings 21 and 31 for the connecting element 6. In a further alternative embodiment, the first component 2 itself can have an internal thread as a nut, the internal thread being formed in the associated through-opening 21.

In order to assemble the device 1, the first component 2 and the second component 3 are screwed together. The device 1 is arranged on the first component 2, for example, by means of the base element 4 and held there, for example by means of the retaining lugs 41. The second component 3 is arranged on the side of the compensating element 5 facing away from the base element 4. The connecting element 6 is then passed through the through-opening 31 in the second component 3, the first cavity H1 and the second cavity H2 and the through-opening 21 in the first component 2 and screwed into the first component 2 and/or the first nut element 8.

The compensating element 5 and the connecting element 6 come into frictional engagement with one another at least in portions, in particular in the region of the inner contour 51 and the outer contour 61. The compensating element 5 and the connecting element 6 thus come into frictional engagement with one another in such a way that when the two components 2 and 3 are connected to one another, a torque exerted by the connecting element 6 can be transmitted to the compensating element 5. By screwing components 2 and 3 together, the unwanted height gap S between the two components to be connected 2 and 3 is compensated for and closed by the compensating element 5 being moved axially from an initial position AP1 into the compensating position AP2 according to the arrow of the first compensating movement AB1 during the screwing process. In the initial position AP1, the compensating element 5 is arranged at a distance according to the height gap S from an underside 32 of the second component 3, as shown in FIG. 1A. In the compensating position AP2, the compensating element 5 is in contact with the underside 32 of the second component 3, as shown in FIG. 1B or 1C.

The base element 4 and the compensating element 5 can each be made from a plastics material. Alternatively, other materials such as metals can also be provided. The base element 4 and the compensating element 5 can be made from the same material or from different materials.

Depending on the size and/or number of the radial overhang(s) 7, the inner contour 51 and the outer contour 61 can also come into form-fitting contact with one another. The larger the radial overhang 7, the more likely that the inner contour 51 and the outer contour 61 will come into form-fitting contact with one another beyond the frictional connection.

Optionally, the inner contour 51 and/or the outer contour 61 can be provided with an engagement structure (not shown in detail). For example, the inner contour 51 and/or the outer contour 61 can be provided with a friction layer, for example a fine-grained or coarse-grained top layer. This increases the adhesion between the connecting element 6 and the compensating element 5 in the region of the interlocking contours.

In addition, the device 1 comprises a second nut element 9. The second nut element 9 serves to synchronize movements of the compensating element 5 with respect to the base element 4 and of the connecting element 6 with respect to the compensating element 5 and the first nut element 8, as has been described above for FIGS. 1B and 1C. For this purpose, the second nut element 9 is arranged in the recess 52 of the compensating element 5.

Figure 3A:
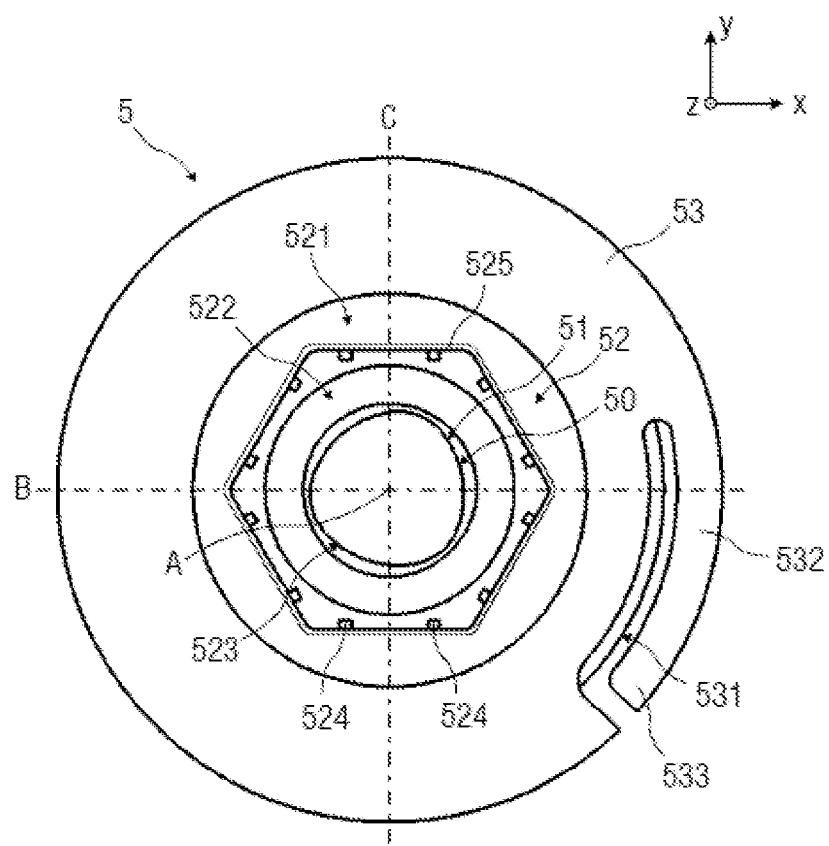
FIG. 3A is a plan view of an embodiment for a compensating element.
Figure 3B:
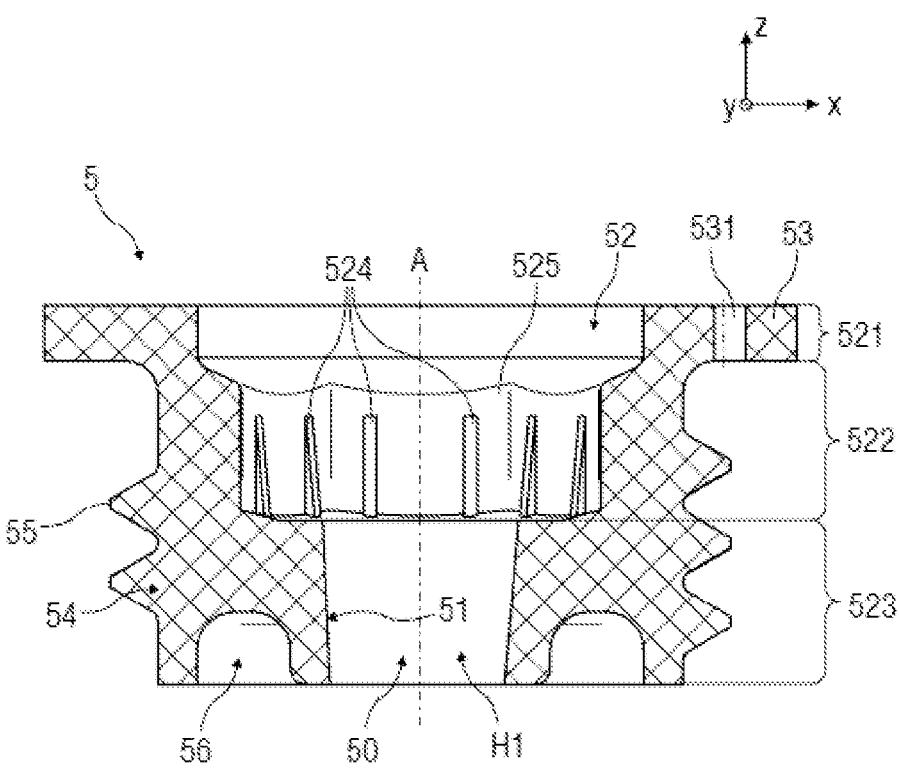
FIG. 3B is a perspective view of an embodiment for a compensating element.

FIGS. 3A and 3B show an embodiment for the axial compensating element 5 in a plan view and in a perspective view, respectively.

The axial compensating element 5 has a flange 53. The flange 53 is designed as a projection or a radial overhang on a hollow-cylindrical shaft 54.

The recess 52 is stepped. In the embodiment, the recess 52 has a first compensating portion 521 for the second nut element 9, a receiving portion 522 for the second nut element 9 and a second compensating portion 523 for the compensating element 5.

As shown in FIG. 3A, the second compensating portion 523 has a non-circular inner contour 51, in particular a trilobular shape in cross section, which allows frictional engagement with the connecting element 6 when said element is screwed in. As shown in FIG. 2B, the inner contour 51 can also have another suitable cross-sectional shape, in particular a round two-cornered, quadrilateral or polygonal shape.

As shown in FIG. 3B, the inner contour 51 also has a cone shape in longitudinal section. This cone shape supports the frictional engagement of the connecting element 6 and the compensating element 5 during the tolerance-compensating movement between the two components 2 and 3.

In addition, the inner contour 51 can be provided with an engagement structure (not shown in detail), in particular a friction layer.

The second nut element 9 is arranged in a form-fitting manner in the receiving portion 522 in its initial position AP1. For this purpose, the receiving portion 522 has a number of longitudinal ridges 524, in particular distributed symmetrically. When the device 1 is assembled, the second nut element 9 is inserted, in particular pressed, into the receiving portion 522, with the longitudinal ridges 524 forming form-fitting contact between the second nut element 9 and the compensating element 5.

The second nut element 9 is a hexagonal nut, for example. For this purpose, the receiving portion 522 has a corresponding hexagonal contour 525 on the inside and at least in portions.

A slot-shaped recess 531 is introduced in the region of the flange 53. This forms a flexible securing arm 532, which is explained in more detail in FIG. 7B.

As shown in FIG. 3B, the longitudinal ridges 524 extend along the longitudinal axis A at least in regions in the region of the receiving portion 522. The longitudinal ridges 524 have a decreasing height in the direction of the first compensating portion 521. In addition, the longitudinal ridges 524 have a shape and/or dimensions such that the second nut element 9 is arranged in the receiving portion 522 at least in a form-fitting manner, in particular in the direction of rotation of the connecting element 6. In addition, the second nut element 9 is arranged in the receiving portion 522 in a frictional manner, in particular in the axial direction along the longitudinal axis A.

The height of the second nut element 9 corresponds approximately to the height of the receiving portion 522.

When the connecting element 6 is inserted into the second nut element 9, they come into threaded engagement with one another. For this purpose, the second nut element 9 has a corresponding internal thread. The connecting element 6 is designed as a connecting screw or a threaded bolt with a corresponding external thread.

In addition, the inner contour 51 of the compensating element 5 can be designed to be yielding or flexible or resilient. For this purpose, the compensating element 5 has an annular groove 56 on the end face thereof opposite the flange 53. The annular groove 56 serves in particular to prevent material accumulation during an injection molding process of a compensating element 5 made from plastics material. In addition, such a compensating element 5 made from plastics material with an annular groove 56 allows a resilient, constant-thickness shape.

The compensating element 5 also has a compensating thread 55 in the embodiment shown in FIGS. 3A and 3B. The compensating thread 55 is an internal thread in each embodiment according to FIGS. 1A to 1C, 5B and 6B and an external thread in each embodiment according to FIGS. 3B, 4, 7A and 8A.

For thread engagement between the compensating element 5 and the base element 4, the base element 4 has an associated base element thread 42, which is shown by way of example in the following FIGS. 4, 7A and 8A. In the embodiments according to FIGS. 4, 7A and 8A, the base element thread 42 is an internal thread. In the embodiments according to FIGS. 1A to 1C, 5B and 6B, the base element thread 42 is an external thread.

The base element thread 42 may be formed as a thread turn having a single crest. Alternatively, the base element thread 42 can also have a plurality of thread turns with corresponding thread crests, in particular two thread crests. With only one thread turn, an open/close tool is advantageously made possible, and thus cost-effective production. With two or more thread turns, on the other hand, a rotatable core is also required for demolding.

FIG. 4 is a sectional view of the device 1 without the connecting element 6.

The second nut element 9 is arranged in a form-fitting manner in the receiving portion 522 in the initial position AP1. The first compensating portion 521 represents the synchronizing height S1 for which the second nut element 9 axially compensates when the connecting element 6 is screwed into the first nut element 8 independently of the compensating element 5 for synchronizing the thread turns according to the second compensating movement AB2, without the compensating element 5 being moved axially, as described by way of example in relation to FIGS. 1B and 1C. This second compensating movement AB2 serves to synchronize the thread engagements, in particular the compensating thread engagement between the compensating element 5 and the base element 4 and the fastening engagement between the connecting element 6 and the first nut element 8. For this purpose, the second nut element 9 is arranged, in particular pressed, lower in the recess 52 in the compensating element 5 than the front or flange surface of the compensating element 5 by at least the synchronizing height S1, in particular by at least one thread pitch of the first thread engagement G1. In other words: The synchronizing height S1 corresponds to at least one thread pitch of the first thread engagement G1 between the compensating element 5 and the base element 4. This internal location of the second nut element 9 in the initial position AP1 allows the axial movement of the second nut element 9 without axial movement of the compensating element 5.

In addition, the second nut element 9 can also move at least in part out of the recess 52. In particular, when the device 1 is assembled, the second nut element 9 can move out of the recess 52 during the second compensating movement AB2 until the second nut element 9 strikes the underside 32 of the second component 3, as shown by way of example in FIGS. 1C and 6B. The sole movement of the second nut element 9 when the connecting element 6 is screwed into the device 1, in particular into the first nut element 8, is the second compensating movement AB2 relative to the compensating element 5 and base element 4 as well as to the components 2 and 3.

Figure 5A:
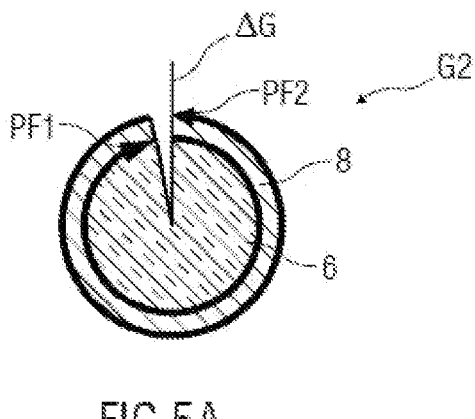
FIG. 5A is a schematic representation of directions of movement of components of the device during a tolerance-compensating connection of the two components and the device in the assembled state, with the compensating element being set in an initial position.

FIG. 5A shows, in a simplified, schematic cross-sectional view, the region of the second thread engagement G2 between the connecting element 6 and the first nut element 8 after the compensating element 5 has been placed in its compensating position AP2 as a result of the first compensating movement AB1 and before the thread starts thereof thread in or interlock when the connecting element 6 is screwed into the first nut element 8. In this embodiment, there is a thread offset ΔG of approximately zero (also referred to as zero offset for short) between the two thread starts of the second thread engagement G2. Thus, when the connecting element 6 is screwed into the first nut element 8, the two thread starts thread together, as shown by the arrows PF1, PF2.

Figure 5B:
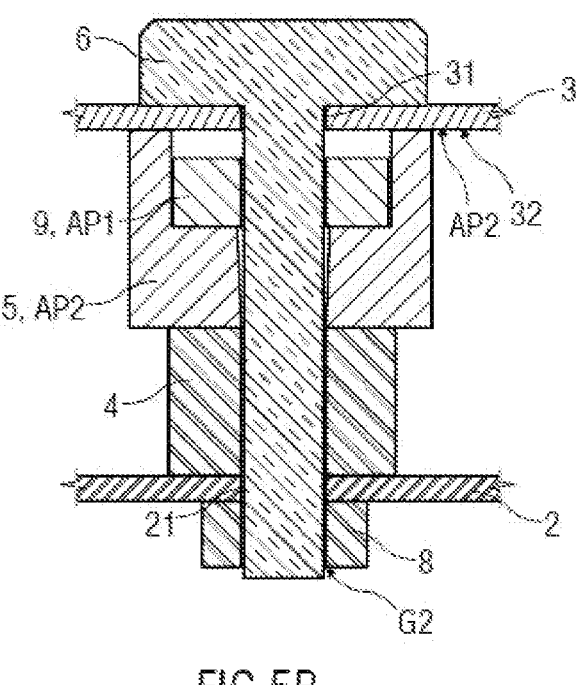
FIG. 5B is a schematic representation of directions of movement of components of the device during a tolerance-compensating connection of the two components and the device in the assembled state, with the compensating element being set in an initial position.

FIG. 5B shows the device 1 in the assembled state, with the compensating element 5 being placed in its compensating position AP2 during assembly due to its first compensating movement AB1. Due to the thread offset ΔG, no synchronization of the thread starts of the second thread engagement G2 is required. Therefore, in this embodiment, no second compensating movement AB2 of the second nut element 9 takes place. The second nut element 9 remains in its initial position AP1. The compensating element 5 is set in its compensating position AP2 as a result of the first compensating movement AB1 and rests against the underside 32 of the second component 3.

As a result of the thread starts being threaded in without synchronization, the connecting element 6 can be screwed into the first nut element 8 until a head underside 62 of the connecting element 6 strikes the top 33 of the second component 3. In this assembled end state of the device 1, the two components 2 and 3 are connected to one another by means of the device 1 so as to compensate for axial tolerances.

The first nut element 8 can be formed separately or attached, in particular welded, to the first component 2.

In an alternative embodiment that is not shown in more detail, the first component 2 has a component thread in the through-opening 21 into which the connecting element 6 engages in a connecting manner, so that the first nut element 8 can be omitted.

Figure 6A:
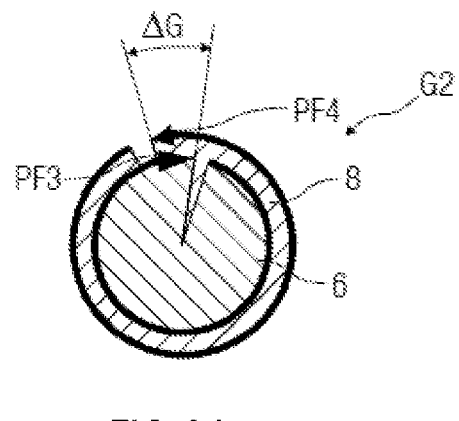
FIG. 6A is a schematic representation of directions of movement of components of the device during a tolerance-compensating connection of the two components and the device in the assembled state, with the compensating element being set in a compensating position.

FIG. 6A shows, in a simplified, schematic cross-sectional view, another example of the region of the second thread engagement G2 between the connecting element 6 and the first nut element 8 after the compensating element 5 has been placed in its compensating position AP2 as a result of the first compensating movement AB1 and before the thread starts of the second thread engagement G2 thread in or interlock when the connecting element 6 is screwed into the first nut element 8. The compensating element 5 is already in its compensating position AP2.

When the connecting element 6 is screwed further into the first nut element 8, it is possible that the thread turn of the connecting element 6 cannot immediately engage in the thread turn of the first nut element 8 or strikes said thread turn.

In the embodiment according to FIG. 6A, there is a thread offset ΔG of more than zero between the two thread starts of the second thread engagement G2. It is therefore necessary to synchronize the two thread starts so that they can thread in safely, as illustrated by arrows PF3 and PF4. In the embodiment shown, the thread offset ΔG is approximately 350°.

In order to synchronize the two thread turns of the second thread engagement G2, therefore, as a result of the third threaded engagement G3 between the second nut element 9 and the connecting element 6, the second nut element 9 is moved axially relative to the compensating element 5 and independently thereof according to the second compensating movement AB2. The second nut element 9 is moved axially, independently of the compensating element 5, counter to the insertion direction of the connecting element 6 until the thread turn of the connecting element 6 engages in the thread turn of the first nut element 8. The maximum length of the second compensating movement AB2 corresponds approximately to a synchronizing height S1.

Depending on the arrangement of the thread turns in relation to one another, the synchronizing height S1 can, under certain circumstances, be up to a rotation of 360° until the thread turns interlock. One revolution can correspond to approximately one thread pitch, for example. This one thread pitch can in turn correspond approximately to the synchronizing height S1 and/or the height gap S.

Figure 6B:
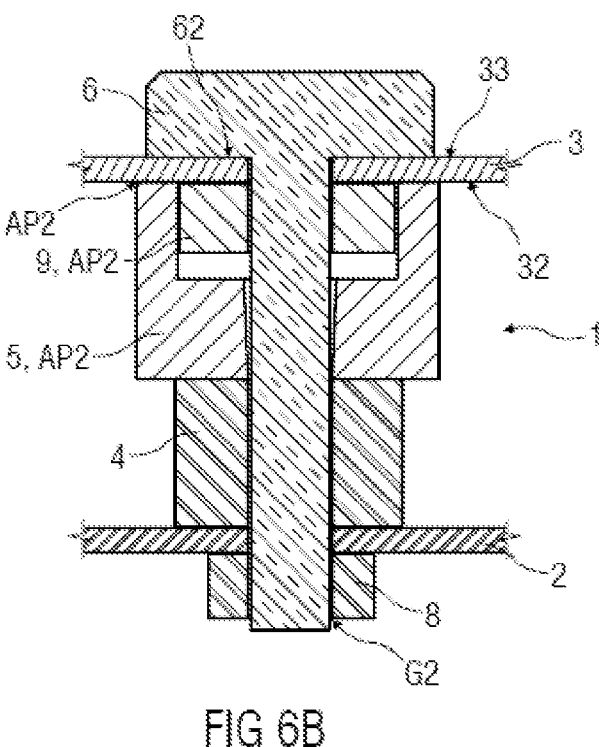
FIG. 6B is a schematic representation of directions of movement of components of the device during a tolerance-compensating connection of the two components and the device in the assembled state, with the compensating element being set in a compensating position.

FIG. 6B shows the device 1 in the assembled state, with both the compensating element 5 and the second nut element 9 being set in the compensating position AP2 due to the large thread offset ΔG.

After the thread turns of the second thread engagement G2 have been synchronized, the connecting element 6 is screwed into the first nut element 8 by a further screwing movement of the connecting element 6 into the device 1 until the head underside 62 of the connecting element 6 strikes the top 33 of the second component 3. In this assembled end state of the device 1, the two components 2 and 3 are connected to one another by means of the device 1 so as to compensate for axial tolerances.

The first nut element 8 can be formed separately or attached, in particular welded, to the first component 2.

In an alternative embodiment that is not shown in more detail, the first component 2 has a component thread in the through-opening 21 into which the connecting element 6 engages in a connecting manner, so that the first nut element 8 can be omitted.

Figure 7B:
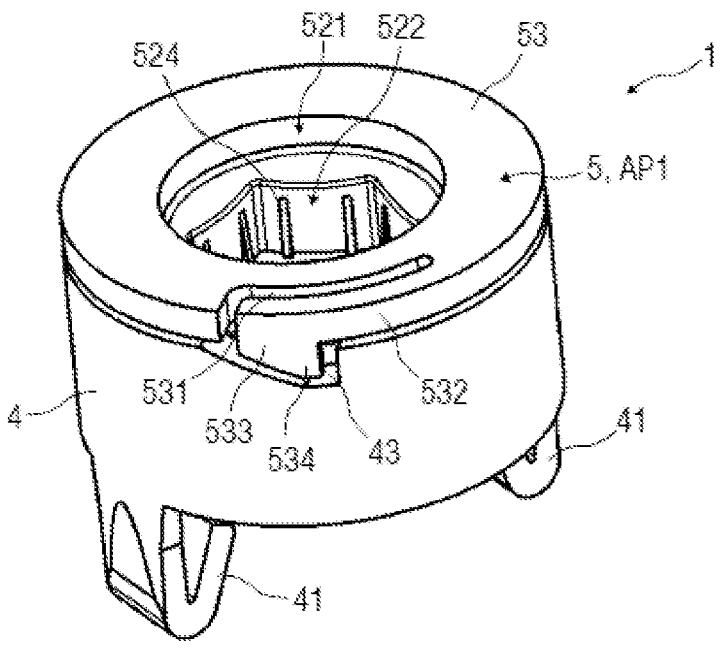
FIG. 7B is a perspective view of the device in the assembled state without a connecting element and without a second nut element, with the compensating element being set in an initial position.

FIGS. 7A and 7B are perspective and partially sectional views of the device 1 in the assembled state without a connecting element 6 and without a second nut element 9, with the compensating element 5 being set in the initial position AP1.

The inner contour 51 is cone-shaped with the first radius 512 at the upper end of the second compensating portion 523 and the second radius 513 at the lower end of the second compensating portion. The first radius 512 is larger than the second radius 513. In addition, a chamfer 514 can be incorporated in the upper edge of the second compensating portion 523.

As shown in FIG. 7B, a free end 533 of the securing arm 532 of the compensating element 5 has a projection 534 which engages in a securing recess 43 in the base element 4 before assembly with the components 2 and 3 takes place. The engagement of the projection 534 in the securing recess 43 forms an anti-twist mechanism between the compensating element 5 and the base element 4. This anti-twist mechanism between the compensating element 5 and the base element 4 serves as a mounting securing mechanism when the device 1 is pre-assembled on the first component 2 and/or as a transport securing mechanism for the device 1 before assembly on the components 2 and 3.

Figure 8B:
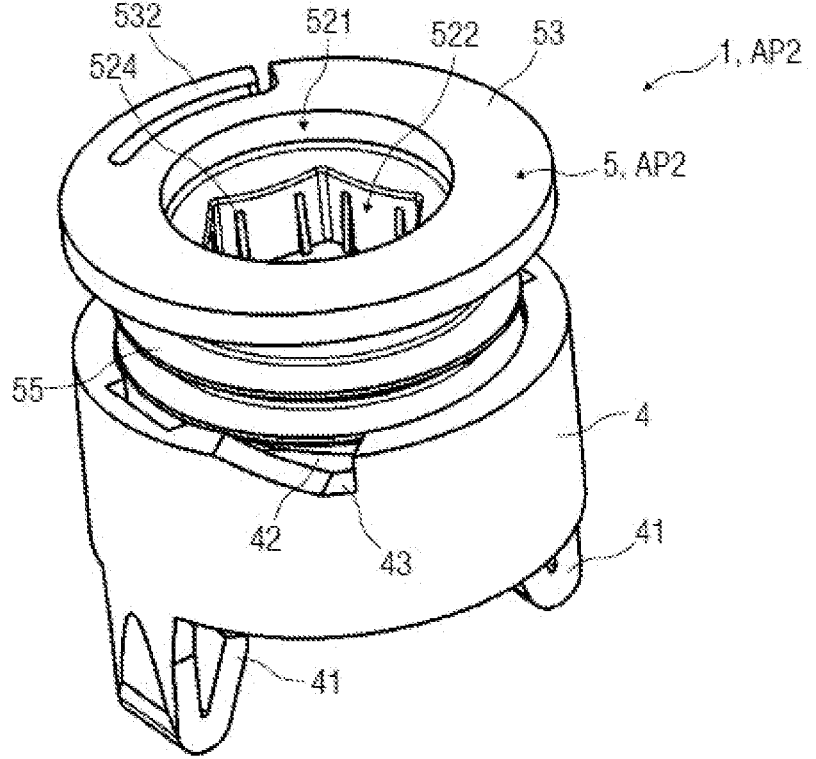
FIG. 8B is a perspective view of the device in the assembled state without a connecting element and without a second nut element, with the compensating element being set in a compensating position.

FIGS. 8A and 8B are perspective and partially sectional views of the device 1 in the assembled state without a connecting element 6 and without a second nut element 9, with the compensating element 5 being set in the compensating position AP2.

LIST OF REFERENCE SIGNS

1 device
2 first component
21 through-opening
3 second component
31 through-opening
32 underside
33 top
4 base element
41 retaining lugs
42 base element thread
43 securing recess
5 compensating element
50 integrated driver
51 inner contour
511 bulge
512 first radius
513 second radius
514 chamfer
52 recess
521 first compensating portion
522 receiving portion
523 second compensating portion
524 longitudinal ridge
525 hexagonal contour
53 flange
531 recess
532 securing arm
533 free end
54 hollow-cylindrical shaft
55 compensating thread
56 annular groove
6 connecting element
61 outer contour
611 bulge
62 head underside
63 screw head
64 threaded shank
7 overhang
8 first nut element
9 second nut element A longitudinal axis
AB1 first compensating movement
AB2 second compensating movement
AP1 initial position
AP2 compensating position
B, C axes (transverse axes)
G1 first thread engagement
G2 second thread engagement
G3 third thread engagement
H1 first cavity
H2 second cavity
KF force flow
KF1 changed force flow
PF1 to PF4 arrows
S height gap
S1 synchronizing height
ZS tensile stress

What is claimed is:

1. A device for compensating for tolerances between two components to be connected to one another, comprising:
    a hollow-cylindrical base element,
    a hollow-cylindrical compensating element which comes into a first threaded engagement with the base element and which can be moved from an initial position into a compensating position via rotation relative to the base element, and
    a connecting element extending through a first cavity of the compensating element for connecting the two components,
  wherein the connecting element comes into a second threaded engagement with one of the two components and/or a first nut element, and
  wherein a second nut element is arranged in a recess of the compensating element in a way that said second nut element comes into a third threaded engagement with the connecting element when the connecting element is screwed into the device,
  wherein when the connecting element is further screwed into one of the two components and/or into the first nut element, the second nut element is axially movable independently of the compensating element and relative thereto,
  wherein the first cavity comprises the recess for the second nut element and a portion axially below the recess and above the first nut element,
  wherein the portion axially below the recess and above the first nut element has an inner contour for direct facing engagement with an outer contour of the connecting element,
  wherein the inner contour is frustoconical with a first upper radius and a second lower radius, the first upper radius being larger than the second lower radius,
  wherein, when the inner contour and the outer contour are aligned concentrically to one another, at least one radial overhang is formed by and between the inner and outer contours.

2. The device according to claim 1, wherein the second nut element is arranged lower in the recess than a flange surface of the compensating element by at least one synchronizing height.

3. The device according to claim 2, wherein the at least one synchronizing height corresponds to at least one thread pitch of the first threaded engagement between the compensating element and the base element.

4. The device according to claim 1, wherein the second nut element is arranged in a form-fitting manner in the compensating element in the initial position.

5. The device according to claim 1, wherein the compensating element comprises a receiving portion in which the second nut element is arranged in a form-fitting manner in the initial position.

6. The device according to claim 5, wherein the receiving portion comprises a number of longitudinal ridges.

7. The device according to claim 6, wherein the receiving portion has a hexagonal contour.

8. The device according to claim 6, wherein the number of longitudinal ridges extend along a longitudinal axis in the receiving portion and have a decreasing height toward a flange surface.

9. The device according to claim 8, wherein said second nut element is movable counter to an insertion direction of the connecting element in a direction of the flange surface of the compensating element.

10. The device according to claim 6, wherein the number of longitudinal ridges have a shape and/or dimensions that the second nut element is arranged in the receiving portion at least in the form-fitting manner.

11. The device according to claim 6, wherein the number of longitudinal ridges have a shape and/or dimensions that the second nut element is arranged in the receiving portion at least in a frictional manner in an axial direction along a longitudinal axis of the device.

12. The device according to claim 1, wherein the at least one radial overhang is formed on the compensating element.

13. The device according to claim 1, wherein the inner contour is non-circular in cross-section and the outer contour is circular in cross-section.

14. The device according to claim 1, wherein the base element and the compensating element have a same internal diameter.

15. The device according to claim 1, wherein the second nut element is braced against a second component.

16. A compensation device, comprising:

a hollow-cylindrical base element, a hollow-cylindrical compensating element, wherein an inner diameter of the compensating element contacts an outer diameter of the base element, a first nut element, a second nut element, and a connecting element, wherein a first cavity of the compensating element comprises a recess for the second nut element and a portion axially below the recess and above the first nut element, wherein the second nut element is independent of the compensating element such that the second nut element can move completely independently of the compensating element in an axial direction, wherein the portion has an inner contour for direct facing engagement with an outer contour of the connecting element, wherein, when the inner contour and the outer contour are aligned concentrically to one another, at least one radial overhang is formed by and between the inner and outer contours.

* * * * *